US007996447B2

(12) United States Patent
Radhakrishnan et al.

(10) Patent No.: US 7,996,447 B2
(45) Date of Patent: Aug. 9, 2011

(54) METHOD AND SYSTEM FOR OPTIMAL FILE SYSTEM PERFORMANCE

(75) Inventors: Ramesh Radhakrishnan, Austin, TX (US); Aziz Gulbeden, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 734 days.

(21) Appl. No.: 11/782,292

(22) Filed: Jul. 24, 2007

(65) Prior Publication Data

US 2009/0030868 A1    Jan. 29, 2009

(51) Int. Cl.
*G06F 12/00* (2006.01)
*G06F 17/30* (2006.01)

(52) U.S. Cl. ..................................... 707/822
(58) Field of Classification Search .............. 707/822, 707/999.001, 999.2
See application file for complete search history.

(56) References Cited

U.S. PATENT DOCUMENTS

| | | | | |
|---|---|---|---|---|
| 6,253,271 | B1* | 6/2001 | Ram et al. | 710/306 |
| 6,684,270 | B1* | 1/2004 | Chmara et al. | 710/38 |
| 6,745,286 | B2* | 6/2004 | Staub et al. | 711/114 |
| 6,990,547 | B2* | 1/2006 | Ulrich et al. | 710/304 |
| 7,356,730 | B2* | 4/2008 | Ulrich et al. | 714/6.12 |
| 2002/0156975 | A1* | 10/2002 | Staub et al. | 711/114 |
| 2002/0174295 | A1* | 11/2002 | Ulrich et al. | 711/114 |
| 2006/0031287 | A1* | 2/2006 | Ulrich et al. | 709/203 |
| 2006/0041718 | A1* | 2/2006 | Ulrich et al. | 711/114 |
| 2006/0173956 | A1* | 8/2006 | Ulrich et al. | 709/203 |
| 2007/0106849 | A1* | 5/2007 | Moore et al. | 711/137 |
| 2007/0143567 | A1* | 6/2007 | Gorobets | 711/202 |
| 2007/0156998 | A1* | 7/2007 | Gorobets | 711/170 |
| 2008/0028164 | A1* | 1/2008 | Ikemoto et al. | 711/154 |
| 2009/0187639 | A1* | 7/2009 | Furuhashi et al. | 709/218 |
| 2009/0210614 | A1* | 8/2009 | Gorobets | 711/103 |

OTHER PUBLICATIONS

Michael Fisch, Brocade StorageX, pp. 1-4, http://www.brocade.com/products/fan/storagex.jsp.
Tara M. Madhyastha, Christopher L. Elford, and Daniel A. Reed, Optimizing Input/Output Using Adaptive File System Policies, pp. 1-22, Department of Computer Science, University of Illinois, Urbana, Illinois 61801.
Patrick R. Eaton, Dennis Geels, and Greg Mori, Clump: Improving File System Performance Through Adaptive Optimizations, Dec. 13, 1999, pp. 1-10.
Joe Wisniewski, Acopia Networks, Acopia Networks Selects Electronics Manufacturing Services Provider Jabil Circuit for Turnkey Services, 2006, pp. 1-2, Lowell, MA, Acopia Networks, Inc, http://www.acopia.com/33372e40-27e3-404f-9546-bb02860cde3b/news-events-archive-detail.htm.
Paul Shread, Enterprise Storage Forum.com, Z-Force Delivers Next-Generation NAS, 2007, pp. 1-7, Jupitermedia Corporation; http://www.enterprisestorageforum.com/sans/news/article.php/2241691.

* cited by examiner

*Primary Examiner* — Mohammad Ali
*Assistant Examiner* — Patrick A Darno
(74) *Attorney, Agent, or Firm* — Haynes and Boone, LLP

(57) ABSTRACT

An automated system for determining an optimal file system on which to store data files is provided. The system includes a data storage device having multiple virtual partitions operable to receive, store, and retrieve a data file. The system additionally includes a plurality of file systems associated with the virtual partitions. One or more of the different file systems have different data storage performance characteristics. A sub-system tracks file characteristics and user requirements for the data file and uses the file characteristics and the user requirements to automatically determine an optimal file system for the data file. The systems and methods provided may be implemented with an information handling system.

20 Claims, 5 Drawing Sheets

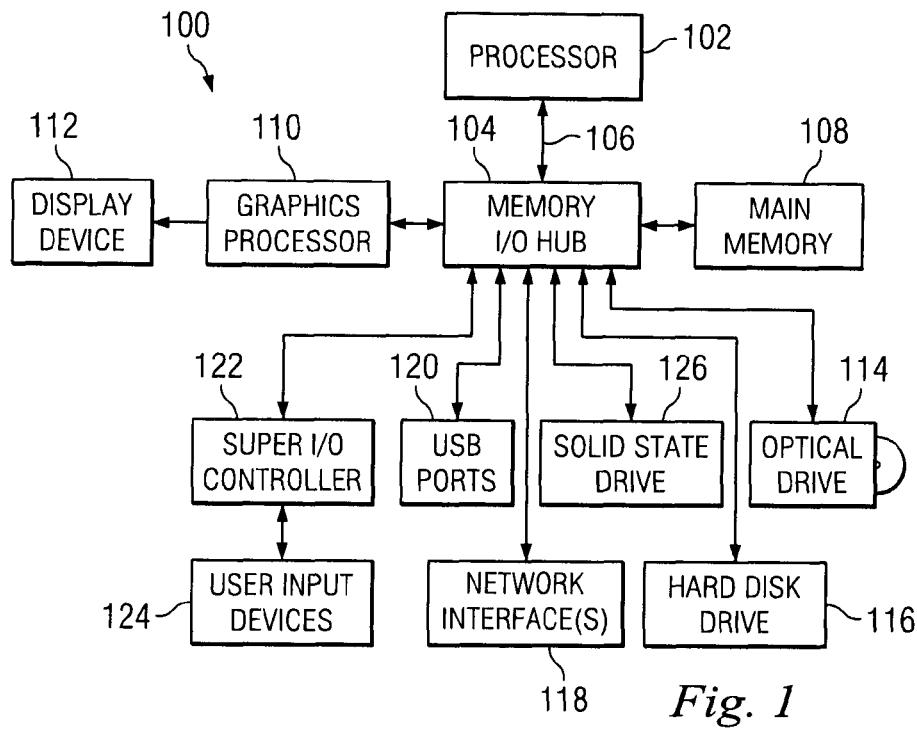
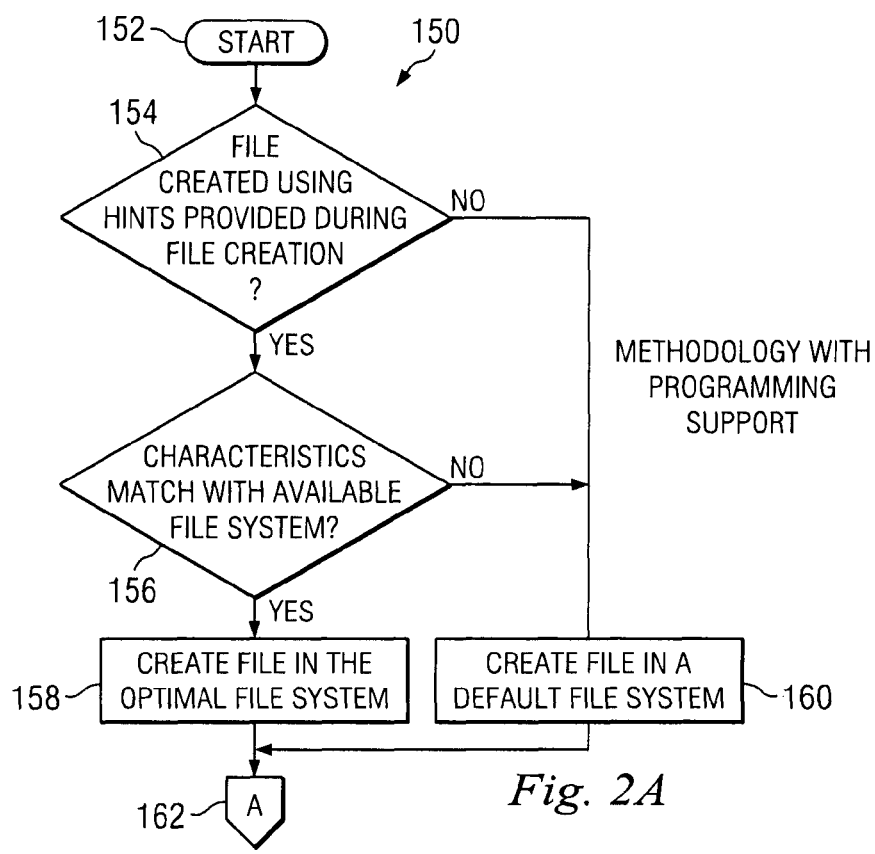
Fig. 1
Fig. 2A

METHOD AND SYSTEM FOR OPTIMAL FILE SYSTEM PERFORMANCE

BACKGROUND

The present disclosure relates generally to information handling systems, and more particularly to optimal file system performance.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components (e.g. an operating system) that may be configured to process, store, and communicate information and may include one or more computer systems, data storage systems, and networking systems.

A file system is a system, including hardware and software, for storing and organizing computer data files to allow easy access to the files. There are currently many file systems available for operating systems such as Linux and UNIX. Having multiple file systems to choose from can be confusing for most users. Therefore, many users end up using a default system or the most basic file systems available (like ext2 or ext3). However, the basic or default file systems may not be the most optimized file system for their applications and workloads. In addition, the basic or default system may not match the features that users are expecting to get from their file systems.

In light of the many file systems available, questions such as which file systems provide the best disk performance and minimize the processor time for a given situation are not easy to answer. To make matters more complicated, system performance can be optimized not only by selecting the most appropriate file system, but also by utilizing the various parameters that are available within the file system. For large-scale and high performance systems, choosing an optimal file system is not an easy choice, but it is a crucial decision. This is because the chosen file system has a noticeable effect on performance, on recovery from errors, on compatibility with other operating systems, and on limitations on partition and file sizes.

There are a variety of ways one can try to determine which file system may be optimal for a given situation. A few examples of file system characteristics are provided below:

(1) Recovery Time after System Crash: One generalization that can be made with regard to high performance computing systems is that it is usually advantageous to use a journaling file systems because of the greatly reduced startup times after system crashes. The popular journaling file systems used in the industry are ext3, XFS, JFS and ReiserFS.

(2) File Access Patterns: Some studies suggest that XFS and JFS produce the best throughput with small files (e.g., 100 MB), while ext2, ext3 are the best with larger files (e.g., 1 GB).

(3) Disk Size Limitations: The choice of journaling file systems can affect disk space availability because of the amount of space needed for the journal. This is a major consideration on small disks, such as Zip disks. For example, on a 100 MB Zip disk, ext3fs and XFS each devote 4 MB to their journals whereas ReiserFS devotes several times this amount to its journal. Space used for inodes is another variable, most of the file systems allocate inodes statically, whereas JFS allocates inodes dynamically, and frees them when they are no longer needed. As a result, the users do not have to estimate the maximum number of files and directories that a file systems will contain.

(4) File systems Limits: Different file systems support various file sizes and volume sizes. Certain users choose their file systems based on the supported file and volume sizes.

(5) Fault Tolerance: Journaling, locking schemes, data integrity check are some of the features that file systems handle differently, Ext2 for example lacks a journal, causing a full file systems check after a crash in order to make sure the file systems is consistent.

(6) Performance: Different file systems have different performance characteristics. In redundant array of independent drives (RAID) arrays, for example, experiments show that xfs performs better than ext3 for sequential read and write operations. Also, depending on the file access patterns, as described above, different file systems may have different performance characteristics.

As one can see from the list above, there are a number of ways to choose an appropriate file system. To make matters worse, there is a very large pool of available file systems that may be used to satisfy the user's needs. A combination of these two factors make choosing a file system a daunting task, and typically results in the user ending up using default file systems on their computer platform.

Another reason why one does not see many of these file systems being used is due to the computing model used on large, high-performance computing systems with large numbers of users, where a system administrator is responsible for creating file systems and its related activities. The user typically does not have permissions to choose, change or create file systems and therefore is limited to what the system administrator assigns to them. Most system administrators use a journaling file system for the user home directory and a high-performance file system to address the user's need for fast disk access. However, this limits the user to just these two file systems, and does not address the user's specific application needs and does not make efficient use of available disk space. This also leads to inefficiencies or unnecessary redundancy. For example, a journal is not required for a temporary file which is created during an intermediate stage of an application.

Accordingly, it would be desirable to provide for optimal file system performance.

SUMMARY

According to an embodiment, an automated system for determining an optimal file system on which to store data files is provided. The system includes a data storage device having multiple virtual partitions operable to receive, store, and retrieve a data file. The system additionally includes a plurality of file systems associated with the virtual partitions. One or more of the different file systems have different data storage performance characteristics. A sub-system tracks file characteristics and user requirements for the data file and uses the file characteristics and the user requirements to automatically determine an optimal file system for the data file. The systems and methods provided may be implemented with an information handling system.

BRIEF DESCRIPTION OF THE DRAWINGS

FIG. 1 illustrates a block diagram of an embodiment of an information handling system (IHS).

FIGS. 2A and 2B illustrate a flowchart of an embodiment of a method to choose an optimal file system.

DETAILED DESCRIPTION

Figure 2B:
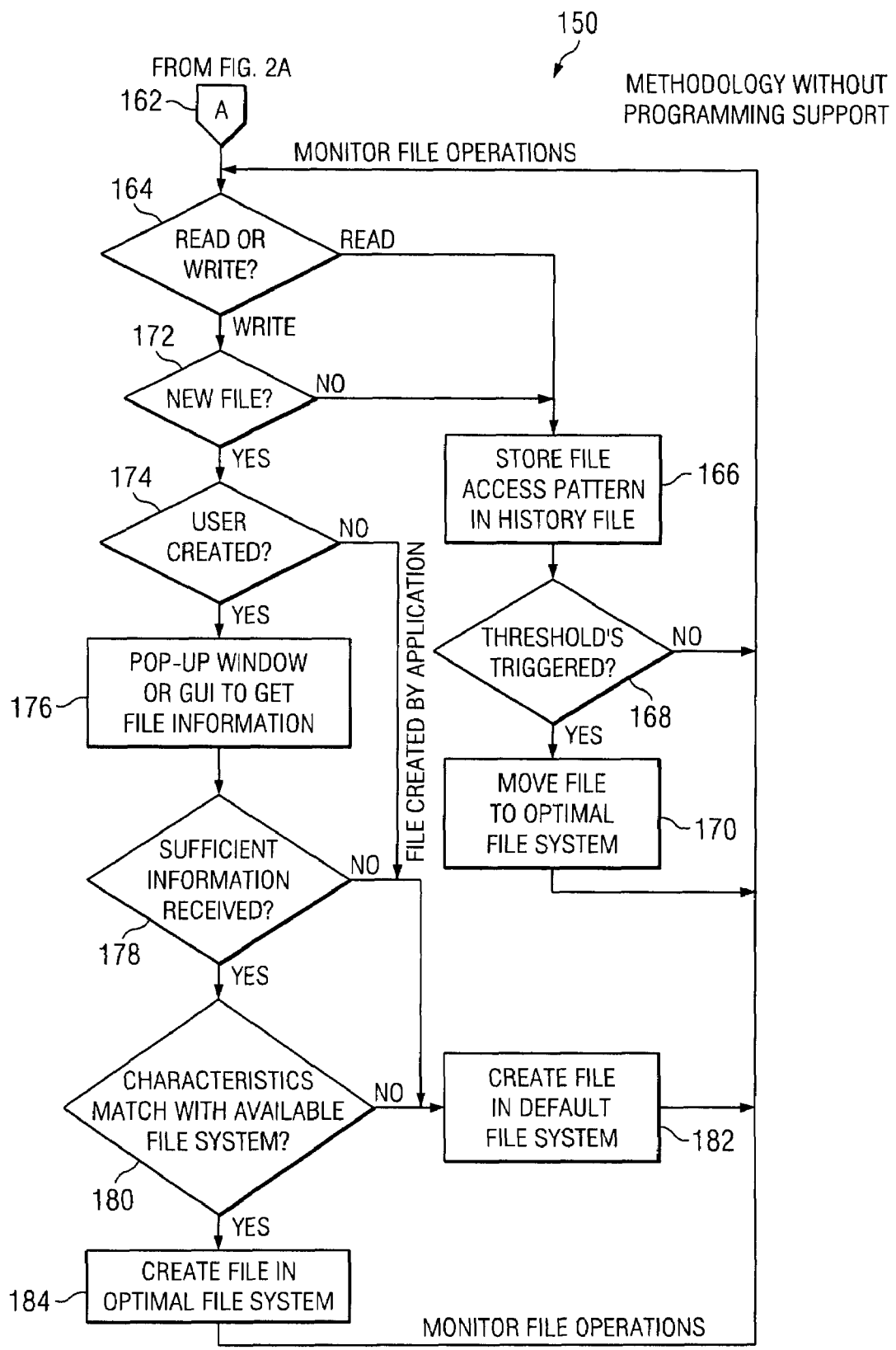

The present disclosure relates generally to information handling systems, and more particularly to a method and system for optimal file system performance. For purposes of this disclosure, an IHS includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a network storage device, or any other suitable device and may vary in size, shape, performance, functionality, and price. The IHS may include random access memory (RAM), one or more processing resources such as a central processing unit (CPU) or hardware or software control logic, read only memory (ROM), and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit communications between the various hardware components.

FIG. 1 is a block diagram of one IHS 100. The IHS 100 includes a processor 102 such as an Intel Pentium™ series processor or any other processor available. A memory I/O hub chipset 104 (comprising one or more integrated circuits) connects to processor 102 over a front-side bus 106. Memory I/O hub 104 provides the processor 102 with access to a variety of resources. Main memory 108 connects to memory I/O hub 104 over a memory or data bus. A graphics processor 110 also connects to memory I/O hub 104, allowing the graphics processor to communicate, e.g., with processor 102 and main memory 108. Graphics processor 110, in turn, provides display signals to a display device 112.

Other resources can also be coupled to the system through the memory I/O hub 104 using a data bus, including an optical drive 114 or other removable-media drive, one or more hard disk drives 116, one or more network interfaces 118, one or more Universal Serial Bus (USB) ports 120, and a super I/O controller 122 to provide access to user input devices 124, etc. The IHS 100 may also include a solid state drive (SSDs) 126 in place of, or in addition to main memory 108, the optical drive 114, and/or a hard disk drive 116. It is understood that any or all of the drive devices 114, 116, and 126 may be located locally with the IHS 100, located remotely from the IHS 100, and/or they may be virtual with respect to the IHS 100.

Not all IHSs 100 include each of the components shown in FIG. 1, and other components not shown may exist. Furthermore, some components shown as separate may exist in an integrated package or be integrated in a common integrated circuit with other components, for example, the processor 102 and the memory I/O hub 104 can be combined together. As can be appreciated, many systems are expandable, and include or can include a variety of components, including redundant or parallel resources.

The present application discloses a system and methodology which creates multiple file systems on a computing platform and makes decisions about how to allocate files to the file systems (unless the user overrides the system and specifies their choice of file systems) in order to provide the best disk and system performance. The decision of which file system to use may be made using multiple considerations. An example of considerations are as follows: (1) user specified requirements, and/or (2) looking at the file characteristics and access patterns of the files themselves.

To address these issues, an IHS 100 has an operating system installed on a partition of a memory or drive 108, 114, 116, 126 and a separate dynamic virtual partition is created for the user's application and data file storage. Multiple file systems may be created in this virtual partition and the user's files are allocated to a file system where it can achieve optimal performance and/or meet its requirements such as security, fault-tolerance, performance, and etc. The present system and method take into consideration the individual file characteristics and the user's requirements to determine an optimal file systems choice. The file characteristics and requirements may be provided to the system in different ways as follows:

(1.) They can be provided to the system by the application as hints at the time of file creation. For example, when a file is created, along with the usual file characteristics (read/write), application will also specify performance related characteristics such as high performance, sequential access, sparse files etc. These hints can be used to determine the file system under which the file should be created. As an example, if the file is very important, the file may be journaled to be protect from a crash. The file characteristics and requirement are determined by what the user(s) are doing with the file over time. See steps 152-162 below.

(2.) The file size, file operations, and file access patterns are observed and logged, and used as a heuristic to determine the optimal file system for that file. This information is also used to determine if the file needs to be moved to a different file system for optimal performance. See steps 162-170 below.

(3). User is prompted to provide information about the file system features that are required when a file or directory is being created. This information can be used to determine the appropriate file system for the newly created file or directory. See steps 172-184 below.

FIGS. 2A and 2B illustrate some of the mechanisms through which the optimal file system selection may be derived, with and without programming support in the form of hints. FIGS. 2A and 2B show a flowchart of an embodiment of an automated method to determine an optimal file system 150. The method begins with programming support at step 152. After beginning at step 152, the method proceeds to decision block 154. At decision block 154, the method inquires to determine whether a given data file was created using hints provided during the creation of the data file. If no, the method proceeds to step 160. If yes, the method proceeds to decision block 156. In decision block 156, the method inquires to determine whether desired characteristics for the file system match with the characteristics of an available file system. If no, the method proceeds to step 160. If yes, the method proceeds to step 158. In step 158, the method creates the given file in the optimal file system. After creating the file in the optimal file system in step 158, the method proceeds to a holding step at 162. If the method arrives at step 160, i.e. inquires 154 or 156 are no, the method creates the given file in a default file system, such as a file system set-up by a system administrator.

FIGS. 2A and 2B continue at step 162 without programming support. Here, the system monitors file operations during accessing of the file. At decision block 164, the method inquires to determine whether the accessing of the file is a read access or a write access of the file. If the access of the file is a read access, the method proceeds to step 166. If the access of the file is a write access, the method proceeds to step 172. At step 166, the method stores the file access history in a history file such as history files 200, 202, 204, and 206 discussed below. Once step 166 is completed, the method proceeds to decision block 168. At decision block 168, the method inquires to determine if any of the system's threshold's have been met or triggered by the accessing of the file. In other words, if, for example, the file's access type, sequentiality, or access size has changed to reach a pre-determined threshold level, the system will move the file to a better-suited file system. If no, the pre-determined threshold has not been met, the method returns to step 164. If yes, the pre-determined threshold has been met, the method proceeds to step 170. At step 170, the system moves the file and associated links from the current file system to the determined optimal file system based on the file characteristics, such as access type, sequentiality, and/or access size. Once the file has been moved to the optimal file system in step 170, the method returns to step 164.

The method 150 continues from step 164 to decision block 172 if the accessing of the file is a write access for the file. The method inquires at decision block 172 to determine whether the file to be written is a new file, or whether the file to be written is an existing file. If no, the file is not new, the method proceeds to step 166 and stores the file access pattern in a history file. If yes, the file is new, the method proceeds to decision block 174. At decision block 174, the method inquires to determine whether the file is a user created file. If no, the file is not a user created file, but rather the file is an application created file, the method proceeds to step 182. If yes, the file is a user created file, the method proceeds to step 176. In step 176, the method opens a pop-up window or other graphical user interface (GUI) to have the one creating the new file input characteristic information about the file. Once the user has input the file characteristic information in step 176, the method proceeds to decision block 178. At decision block 178, the method inquires to determine whether sufficient file characteristic information was received by the user to help the system determine an optimal file system for the file. If no, sufficient information was not received from the user, the method proceeds to step 182. If yes, the system did receive sufficient information from the user to determine an optimal file system for the file, the method proceeds to decision block 180. At decision block 180, the method inquires to determine whether the file characteristics entered in step 176 correspond with an available file system. If no, the entered characteristics do not match an available file system, the method proceeds to step 182. If yes, the entered characteristics do match the characteristics of an available file system, the method proceeds to step 184. If the method arrives at step 182, the method creates the file and any associated links in a default file system rather than a determined optimal file system. Once the file has been created in the default file system in step 182, the method returns to step 164. On the other hand, if the method arrives at step 184, the system creates the file and any associated links in the determined optimal file system. Once the file has been created in the optimal file system in step 184, the method returns to step 164.

Figure 3:
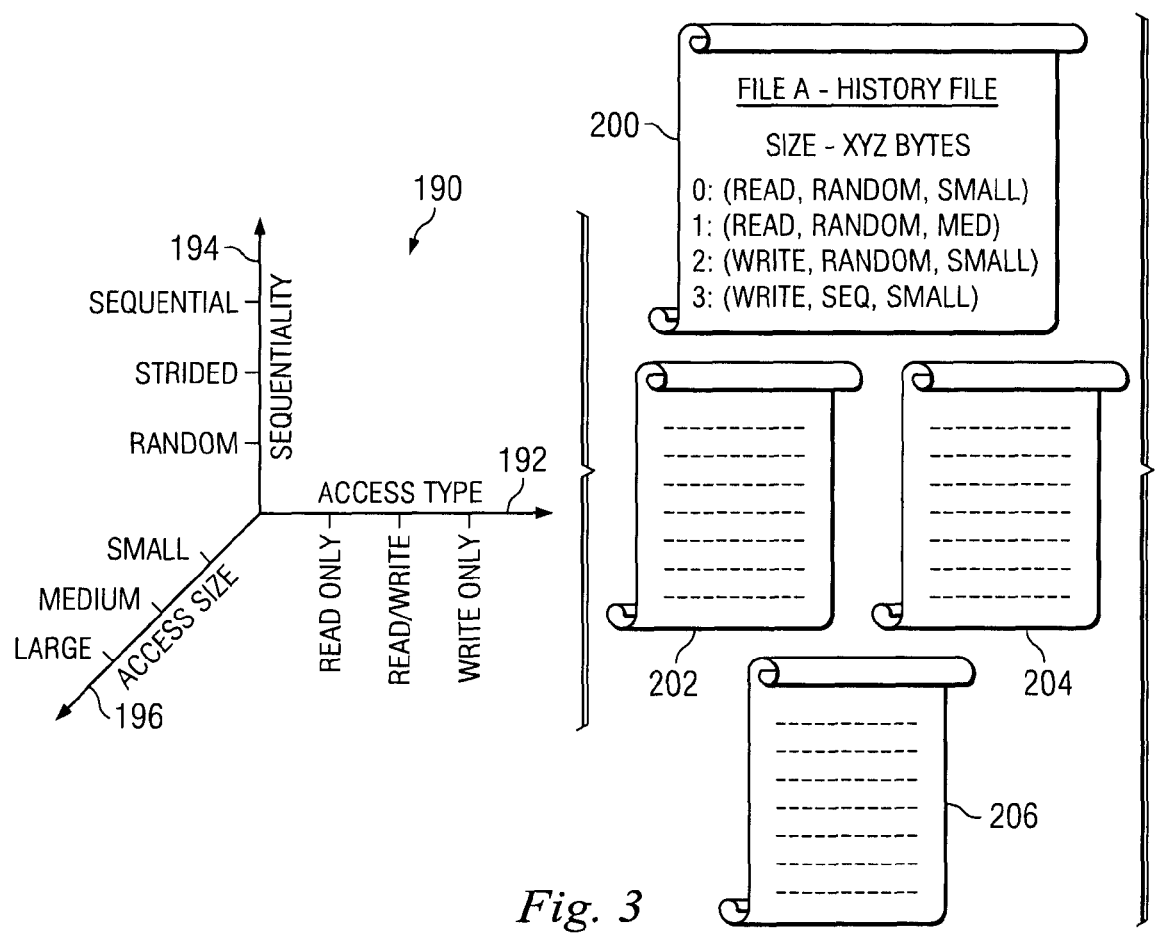
FIG. 3 illustrates categories for influencing file system selection for one embodiment of the method of FIG. 2.

FIG. 3 shows how a history of access patterns formed by storing the appropriate file performance characteristics over time can be used to influence file system selection. Examples of file performance characteristics useful for determining an optimal file system are found in the file history axis 190. The file history axis 190 has an x-axis 192 showing file access type, such as, read only, read/write, and write only. The file history axis 190 has a y-axis 194 showing file sequentiality, such as random, strided, and sequential. The file history axis 190 also has a z-axis 196 showing file access size, such as small, medium, and large. It will be understood by those ordinarily skilled in the art that one or more of these and/or other types of file characteristics can be used to determine an optimal file system for the given data file. FIG. 3 also shows exemplary file histories 200, 202, 204, and 206. Each of these histories 200, 202, 204, and 206 relate to a given data file. As an example, file history 200 gathers and stores the associated data file's history for each access of the file and records the file's characteristics at each saving/writing of the file. Therefore, the method 150 can determine in step 168 whether one of the file's characteristics stored in the file history 200 triggers or exceeds a pre-determined threshold for the characteristics and can then move the given data file and any associated links to the determined optimal file system in step 170.

Figure 4:
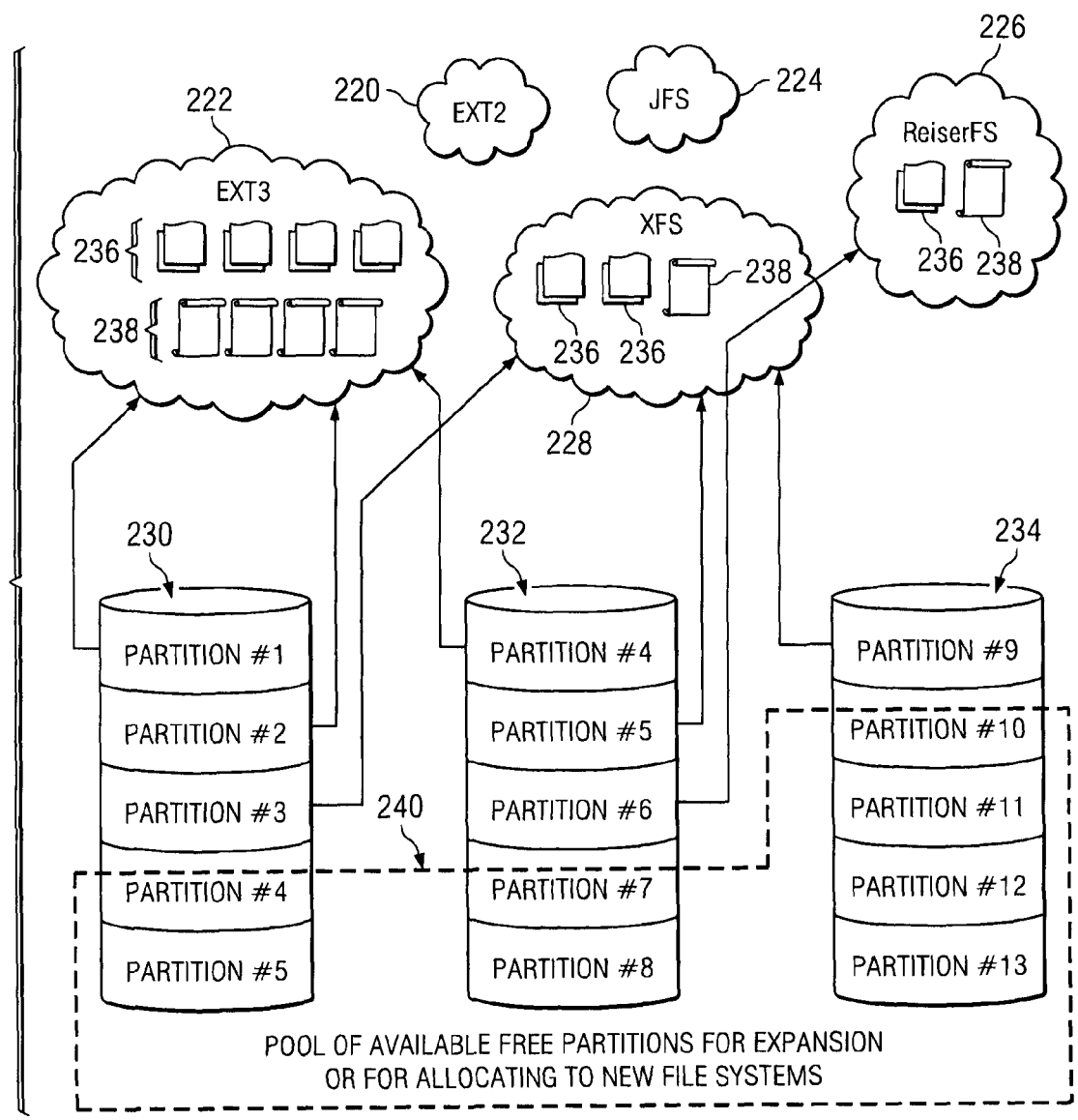
FIG. 4 illustrates file system choices and allocation method for one embodiment of the method of FIG. 2.

FIG. 4 shows an implementation of an embodiment of a system for optimal file system performance. This embodiment has multiple, commonly known, file systems, EXT2 220, EXT3 222, JFS 224, ReiserFS 226, and XFS 228. These and other file systems may be used in accordance to the present embodiment. The system uses a multi-file system hierarchy system having multiple data storage disk devices 230, 232 and 234. These storage devices 230, 232 and 234 may be optical drives, such as optical drive 114, hard disk drives, such as hard disk drive 116, solid state drives, such as solid state drive 126, or any other type and/or combination of data storage media. For this system, multiple partitions are created on available disk space 230, 232 and 234 and a file systems 220, 222, 224, 226 and 228 are created on each some of the partitions, thereby leaving many free partitions for future file system expansion. File system expansion may be an expansion of an existing file system or a new file system having different characteristics. As each file system 220, 222, 224, 226 and 228 approaches its maximum capacity limits of files 236 and file histories 238, new partitions from the pool of available partitions 240 are formatted and used to expand the physical storage capacity for that file system. As an example, if partition #2 is nearing capacity, the system may format or link to partition #4 in the pool of available partitions 240 as an addition to partition #2 for file system EXT3. This ensures that there is no wastage of disk capacity for file systems that do not need the storage capacity. In other words, in this embodiment, there is a single namespace available for the user. Under this namespace, there are multiple file systems 220, 222, 224, 226 and 228 available on virtual disk partitions (on the same or different disks 230, 232 and/or 234) that comprises multiple physical disk partitions.

Figure 5:
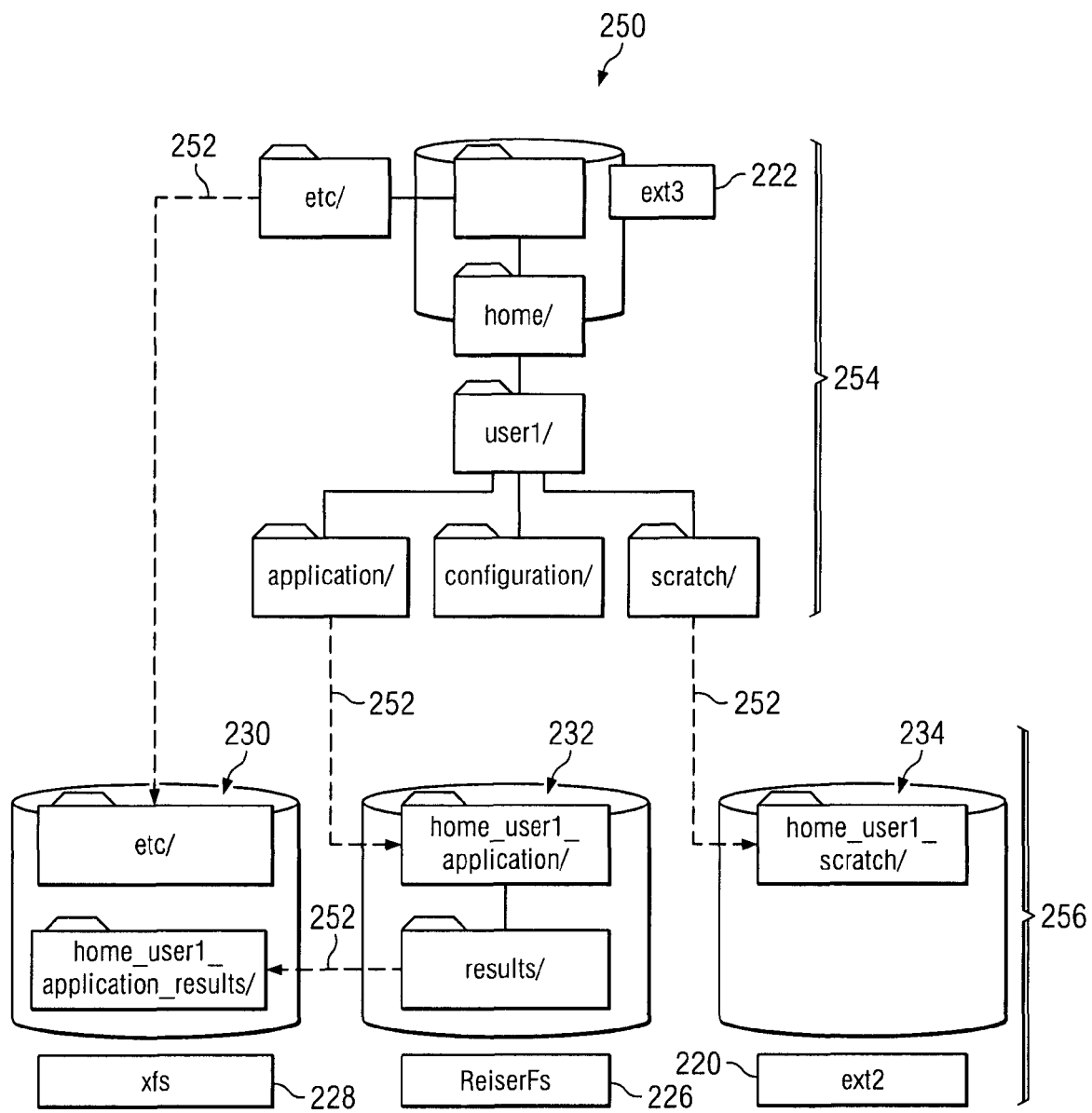
FIG. 5 illustrates one embodiment of directory tree mapping for one embodiment of the method of FIG. 2.

FIG. 5 shows how a directory tree 250 may be mapped onto the physical disks 230, 232, and/or 234 in a UNIX or Linux type platform. In UNIX and Linux type directory and file structures, there are a number of ways for creating a link to different file systems 220, 222, 224, 226 and 228, as is commonly known by those skilled in the art. The software view of this is shown bracketed by 254. The hardware view of this is shown bracketed by 256. One way of creating these links is to create soft links 252 that allow creating a link to a file or to a directory. According to one embodiment, if a directory is in file system A and a subdirectory that will be placed at a different file system, such as file system B, are created, two operations are performed. First, a directory is created in file system B. Second, a symbolic link in file system A points to the newly created directory. After these two operations are performed by the operating system, other file systems operations can be performed by the applications in a transparent manner.

As can be seen in FIG. 5, the root file systems is on the ext3 file system. The /etc directory is stored in a separate partition formatted as XFS, and the /etc directory can be accessed by following the symbolic link. Similarly, the application directory under /home/user1/ is kept in ReiserFS and the subdirectory /home/user1/application/results is kept in the XFS file system. To remove these links, a delete command is issued by a user. When the delete command is issued on a directory, the directory and its' soft link are deleted by the operating system. Thus, both the file and the link are removed.

In a Windows™ type application, such a plethora of file system choices are not available. However, a Windows™ user can still benefit from having multiple file system choices on their computing platform, and having the system assign files to a file system automatically for optimal performance and feature set requirements. In Windows™, the system of deciding the optimal file system will be the same as described for the UNIX/Linux platforms above. The actual implementation of multiple file systems existing in the same namespace is possible in Windows™ Vista™ and newer versions because these operating systems includes symbolic link capability in its kernel that function similar to UNIX/Linux symbolic links.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A system for determining an optimal file system to store data, the system comprising:
a data storage system including a plurality of virtual partitions that are operable to store data files;
a plurality of file systems located on the plurality of virtual partitions of the data storage system, wherein at least two of the plurality of file systems include different data storage performance characteristics; and
a sub-system that is operable to:
determine an access pattern history for each of a plurality of data files that are stored on the plurality of virtual partitions, wherein the access pattern history includes, for each access of the data file, a plurality of file characteristics including a file access type, a file sequentiality, and a file access size; and
in response to at least one of the plurality of file characteristics in the access pattern history reaching a threshold for a first data file that is stored using a first file system, move the first data file such that the first data file is stored using a second file system having better data storage performance characteristics relative to the first file system with regard to the at least one of the plurality of file characteristics that reached the threshold.

2. The system of claim 1, wherein the sub-system is operable to moves the first data file from a the first file system to the second file system in response to more than one of the plurality of file characteristics in the access pattern history for the first data file reaching a threshold.

3. The system of claim 1, wherein the sub-system is operable to determine at least one user specified requirements for a second data file that is stored using the first file system and move the second data file such that the second data file is stored using the second file system having better data storage performance characteristics relative to the first file system with regard to the at least one user specified requirement.

4. The system of claim 1, further comprising:
a sub-system that is operable to track capacity of the plurality of file systems and automatically format one or more of the plurality of virtual partitions of the data storage system to add capacity to one or more of the plurality of file systems.

5. The system of claim 1, wherein the access pattern history for each of the plurality of data files includes a data file size.

6. The system of claim 1, wherein the file access type for each file access history includes a read only access type, a read/write access type, and a write only access type, and the file sequentiality for each file access history includes a random sequentiality, a strided sequentiality, and a sequential sequentiality.

7. The system of claim 1, further comprising:
an operating system stored on the data storage system.

8. An information handling system comprising:
a processor;
a data storage system including a plurality of virtual partitions that are operable to store data files; and
an automated system for determining an optimal file system to store data, wherein the automated system further comprises:
a plurality of file systems located on the plurality of virtual partitions of the data storage system, wherein at least two of the plurality of file systems include different data storage performance characteristics; and
a sub-system that is operable to:
determine an access pattern history for each of a plurality of data files that are stored on the plurality of virtual partitions, wherein the access pattern history includes, for each access of the data file, a plurality of file characteristics including file access type, a file sequentiality, and a file access size; and
in response to at least one of the plurality of file characteristics in the access pattern history reaching a threshold for a first data file that is stored using a first of the plurality of file systems, move the first data file such that the first data file is stored using a more optimal of the plurality of file systems that has better performance characteristics relative to the first of the plurality of file systems with regard to the at least one of the plurality of file characteristics that reached the threshold.

9. The system of claim 8, wherein the sub-system is operable to moves the first data file to the more optimal of the plurality of file systems in response to more than one of the plurality of files characteristics in the access pattern history for the first data file reaching a threshold.

10. The system of claim 8, wherein the sub-system is operable to determine at least one user specified requirements for a second data file that is stored using the first of the plurality of file systems and move the second data file such that the second data file is stored using the more optimal of the plurality of file systems relative to the first of the plurality of file systems with regard to the at least one user specified requirement.

11. The system of claim 8, further comprising:
a sub-system that is operable to track capacity of the plurality of file systems and automatically format one or more of the plurality of virtual partitions of the data storage system to add capacity to one or more of the plurality of file systems.

12. The system of claim 8, wherein the access pattern history for each of the plurality of data files includes a data file size.

13. The system of claim 8, wherein the file access type for each file access history includes a read only access type, a read/write access type, and a write only access type, and the file sequentiality for each file access history includes a random sequentiality, a strided sequentiality, and a sequential sequentiality.

14. The system of claim 8, further comprising:
an operating system stored on the data storage system.

15. A method for determining an optimal file system to store data, the method comprising:
partitioning a data storage system to have a plurality of virtual partitions that are operable to store data files;
locating a plurality of file systems on the plurality of virtual partitions of the data storage system, wherein at least two of the plurality of file systems include different data storage performance characteristics;
determining an access patterns history for each of a plurality of data files that are stored on the plurality of virtual partitions, wherein the access pattern history includes, for each access of the data file, a plurality of file characteristics including a file access type, a file sequentiality, and a file access size; and
in response to at least one of the plurality of file characteristics in the access pattern history reaching a threshold for a first data file that is stored using a first file system, moving the first data file such that the first data file is stored using a second file system having better data storage performance characteristics relative to the first file system with regard to the at least one of the plurality of file characteristics that reached the threshold.

16. The method of claim 15 further comprising:
moving the first data file from the first file system to the second file system in response to more than one of the plurality of file characteristics in the access pattern history for the first data file reaching a threshold.

17. The method of claim 15 further comprising:
determining at least one user specified requirements for a second data file that is stored using the first file system and moving the second data file such that the second data file is stored using the second file system having better data storage performance characteristics relative to the first file system with regard to the at least one user specified requirement.

18. The method of claim 15 further comprising:
tracking capacity of the plurality of file systems and automatically formatting one or more of the plurality of virtual partitions of the data storage system to add capacity to one or more of the plurality of file systems.

19. The method of claim 15 wherein the access pattern history for each of the plurality of data files includes a data file size.

20. The method of claim 15, wherein the file access type for each file access history includes a read only access type, a read/write access type, and a write only access type, and the file sequentiality for each file access history includes a random sequentiality, a strided sequentiality, and a sequential sequentiality.

* * * * *

UNITED STATES PATENT AND TRADEMARK OFFICE
CERTIFICATE OF CORRECTION

| | | |
|---|---|---|
| PATENT NO. | : 7,996,447 B2 | Page 1 of 1 |
| APPLICATION NO. | : 11/782292 | |
| DATED | : August 9, 2011 | |
| INVENTOR(S) | : Ramesh Radhakrishnan and Aziz Gulbeden | |

It is certified that error appears in the above-identified patent and that said Letters Patent is hereby corrected as shown below:

Column 8, line 5, the word "moves" should be --move--
Column 8, line 5, before the word "the" delete "a"
Column 8, line 10, the word "requirements" should be --requirement--
Column 8, line 62, the word "moves" should be --move--
Column 8, line 67, the word "requirements" should be --requirement--
Column 9, line 32, the word "patterns" should be --pattern--
Column 10, line 15, the word "requirements" should be --requirement--

Signed and Sealed this
Thirty-first Day of July, 2012

David J. Kappos
*Director of the United States Patent and Trademark Office*